April 21, 1953 R. Z. DRAKE 2,635,729
APPARATUS FOR HANDLING AND STORING LUMBER
Filed Oct. 24, 1945 12 Sheets-Sheet 2
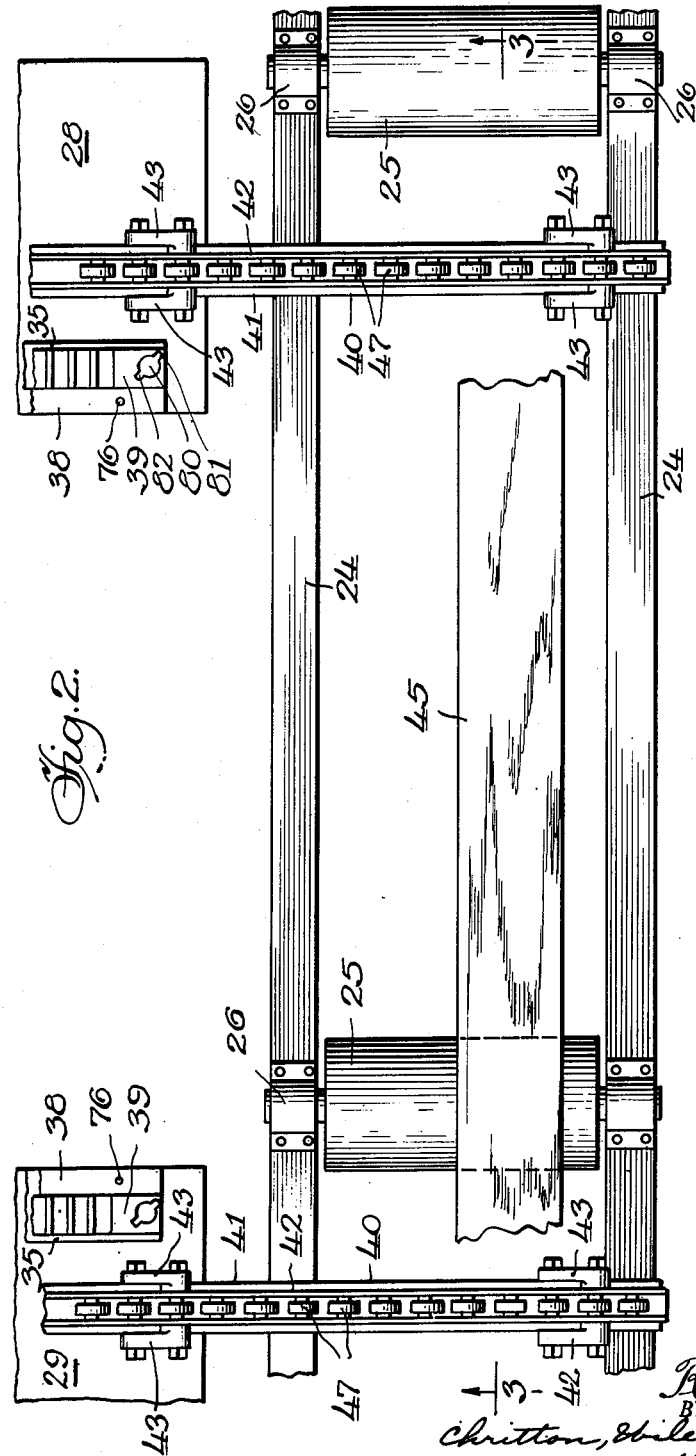
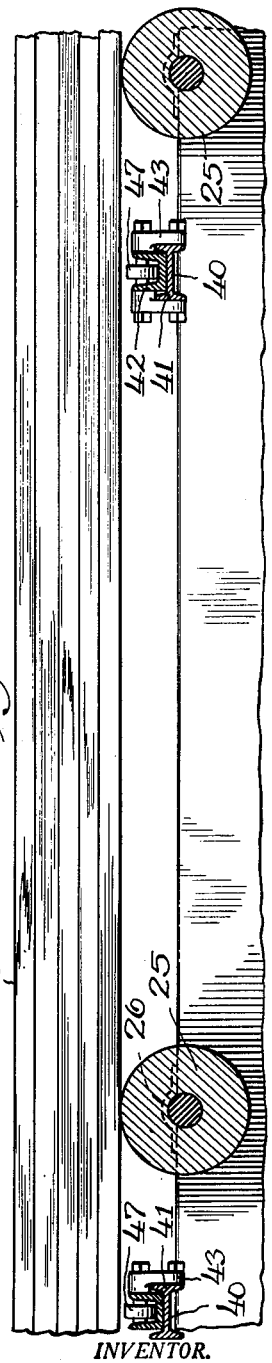
INVENTOR.
Robert Z. Drake

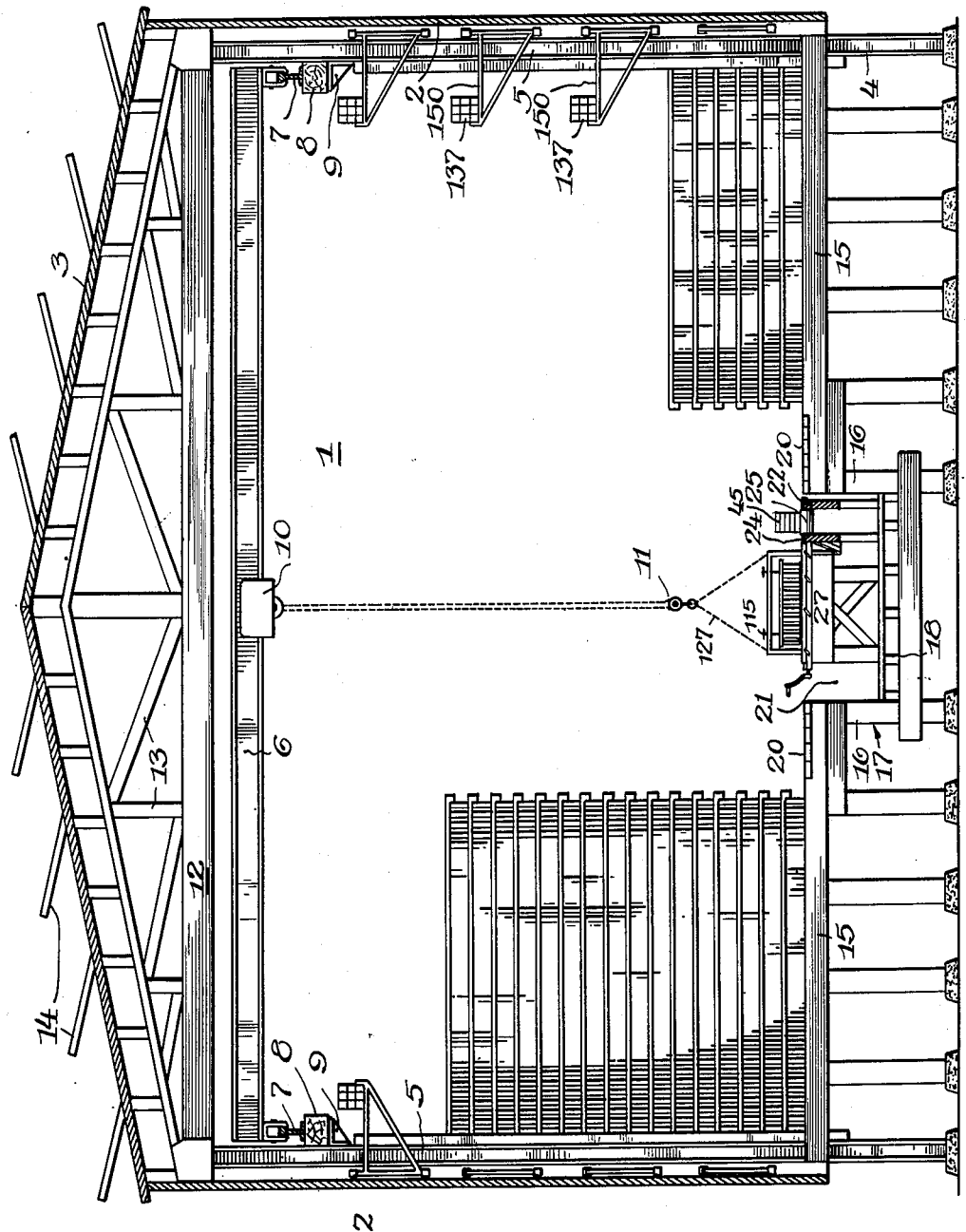

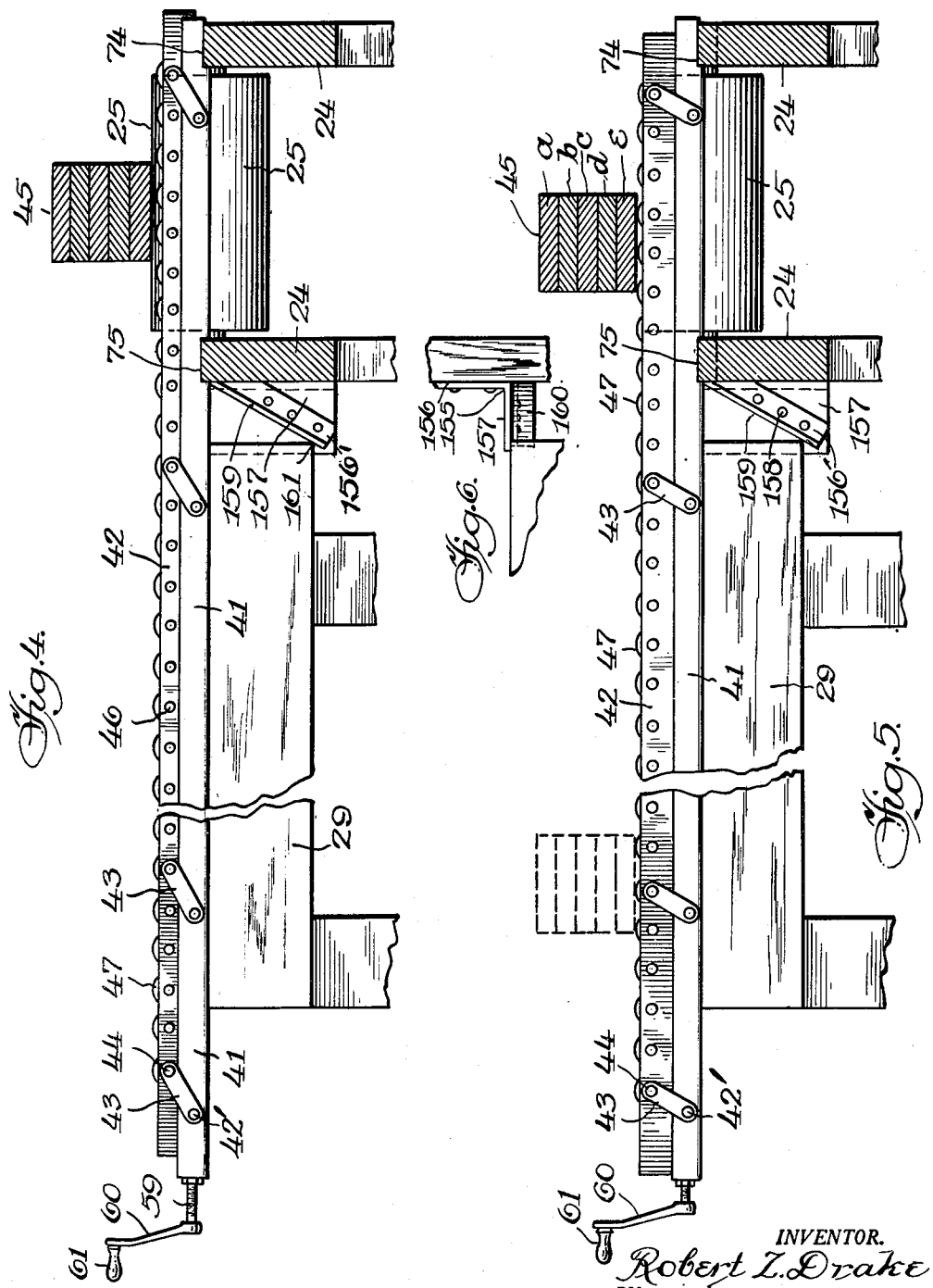

April 21, 1953  R. Z. DRAKE  2,635,729
APPARATUS FOR HANDLING AND STORING LUMBER
Filed Oct. 24, 1945  12 Sheets-Sheet 4

INVENTOR.
Robert Z. Drake
BY Chritton, Wiles, Schroeder,
Merriam & Hofgren
Attys.

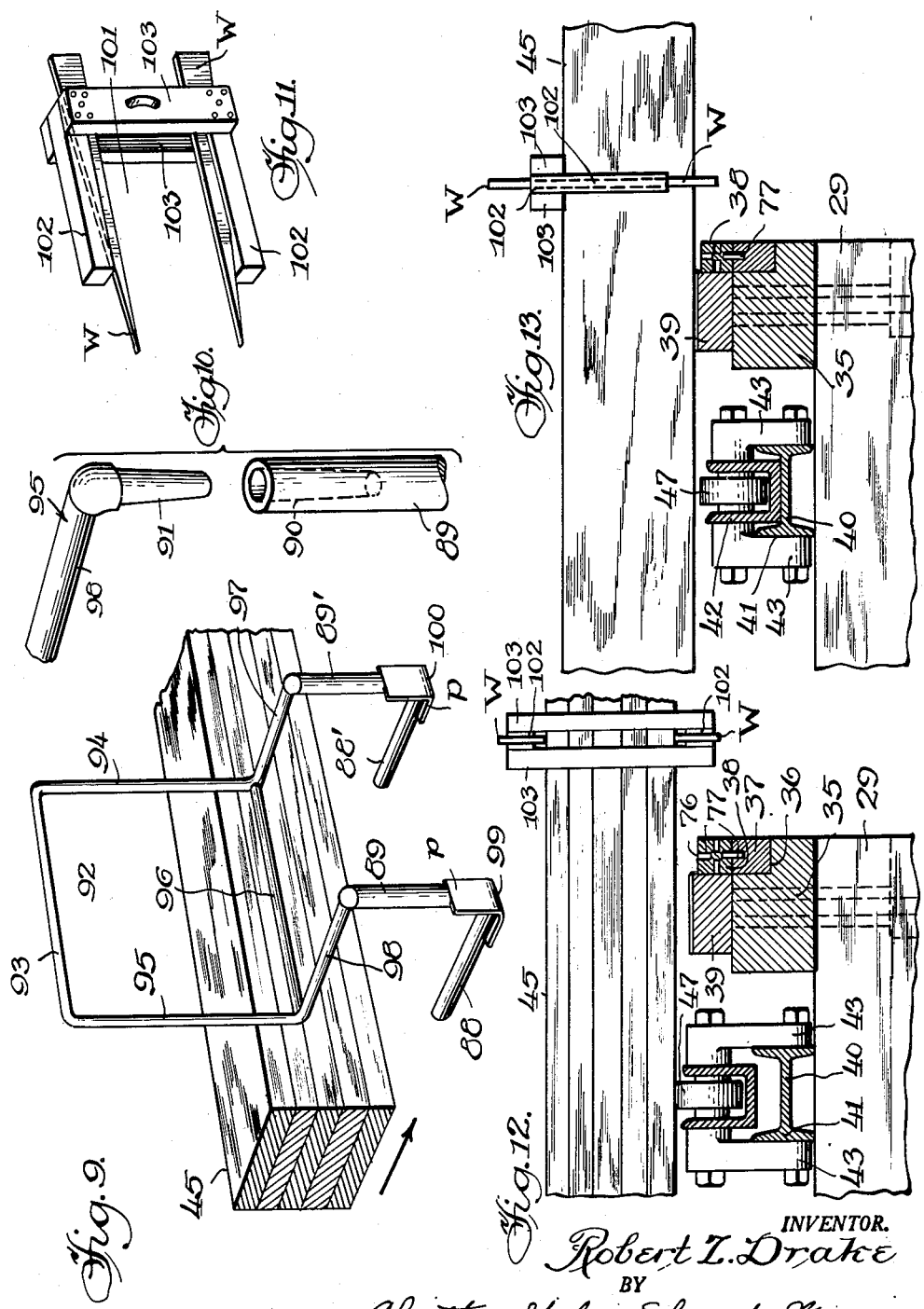

April 21, 1953 R. Z. DRAKE 2,635,729
APPARATUS FOR HANDLING AND STORING LUMBER
Filed Oct. 24, 1945 12 Sheets-Sheet 6
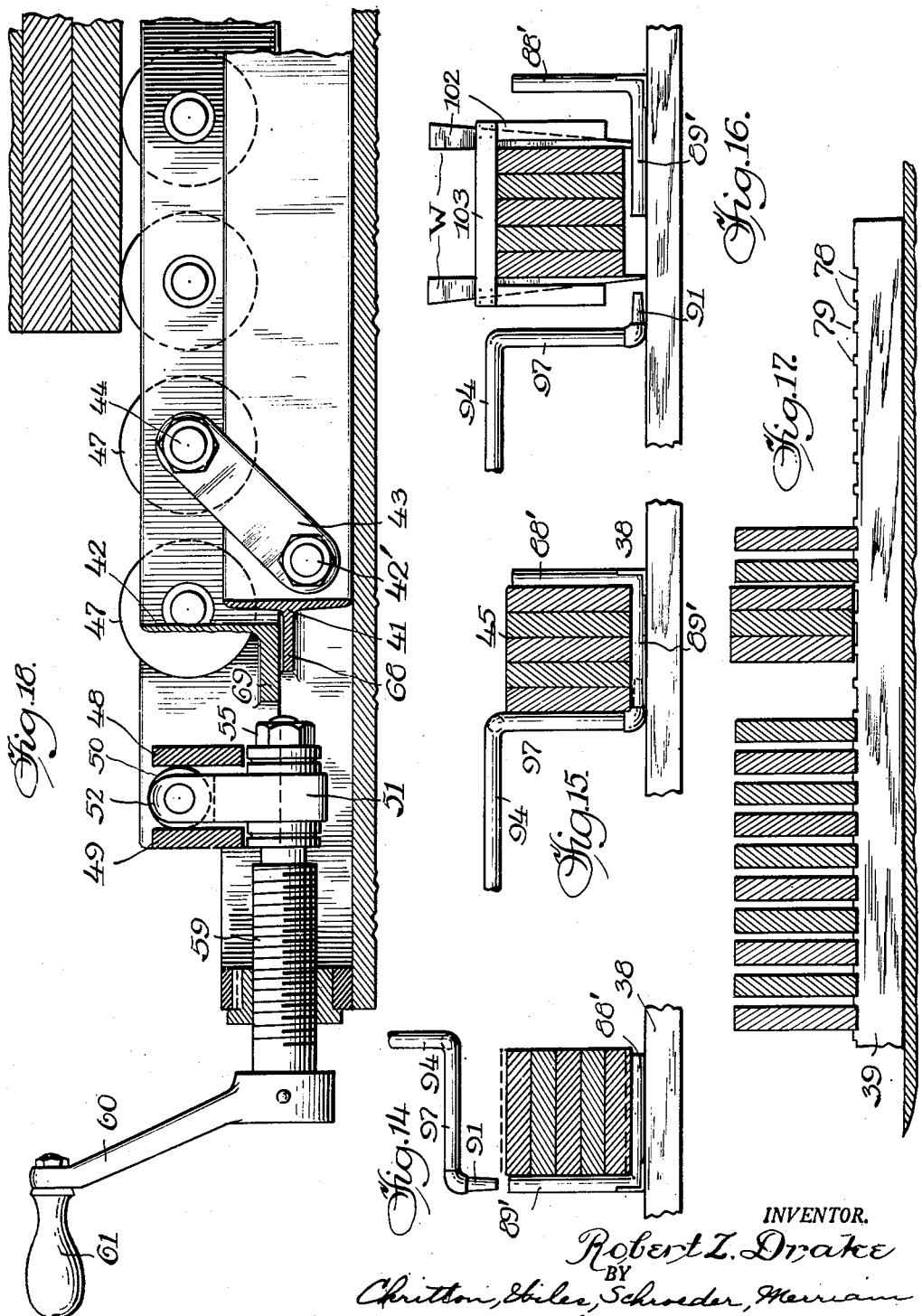

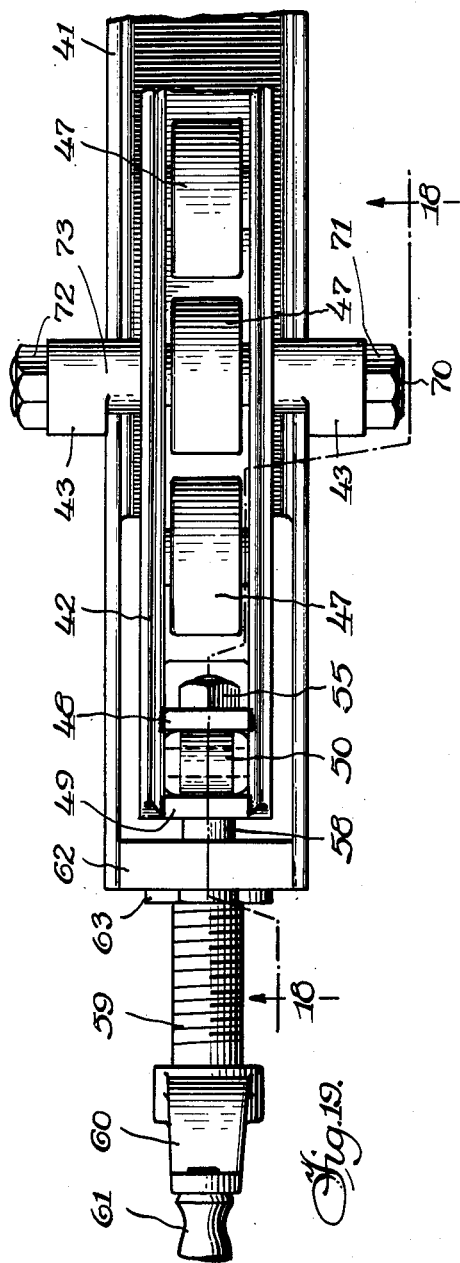
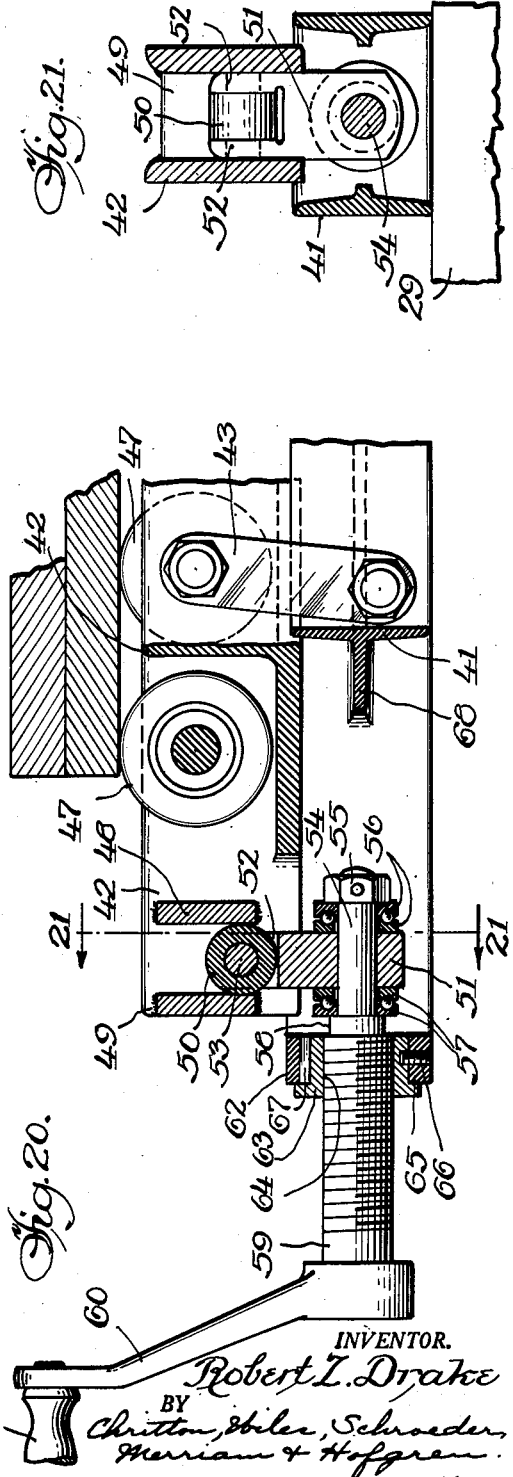

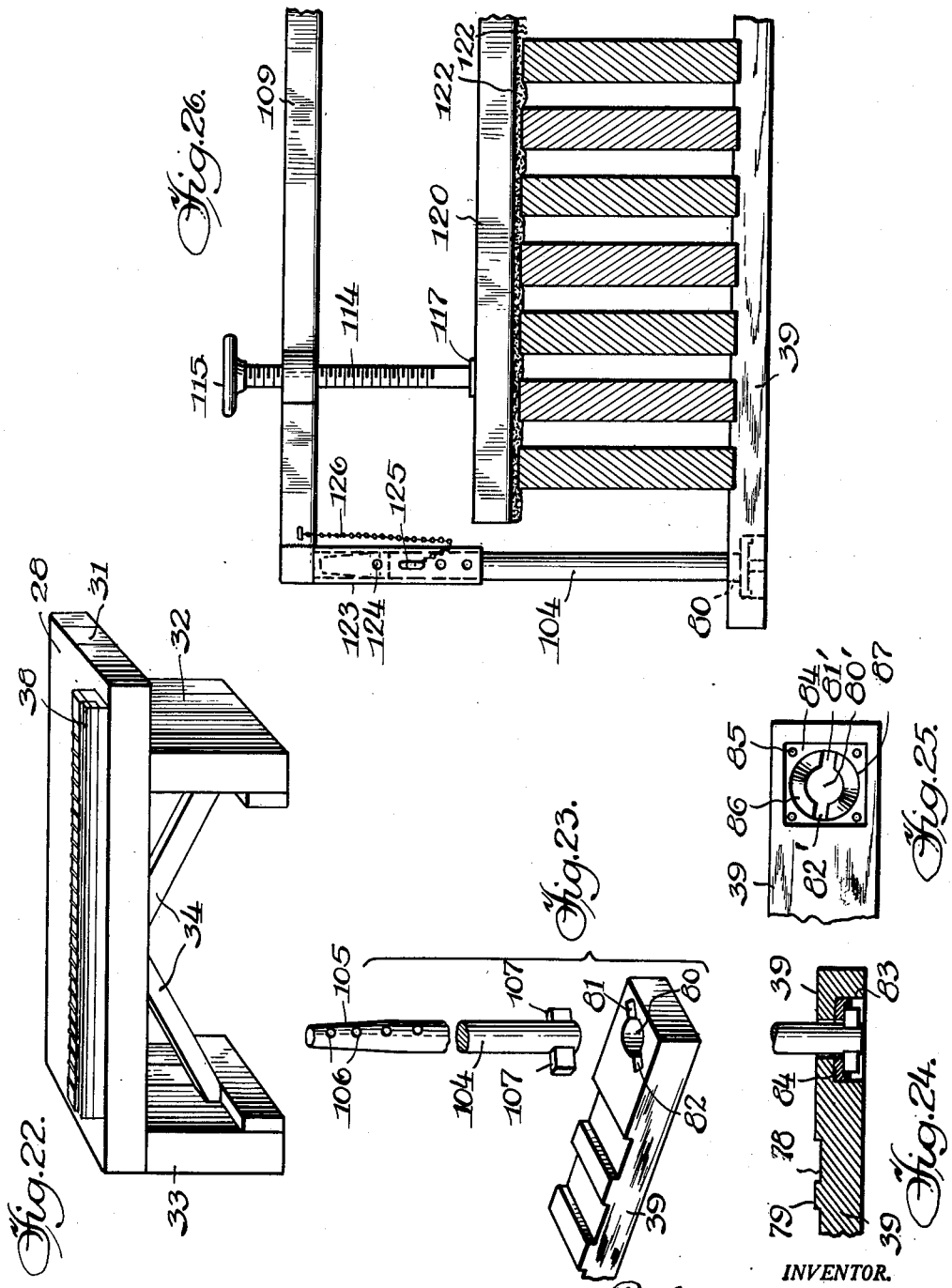

April 21, 1953 R. Z. DRAKE 2,635,729
APPARATUS FOR HANDLING AND STORING LUMBER
Filed Oct. 24, 1945 12 Sheets-Sheet 9
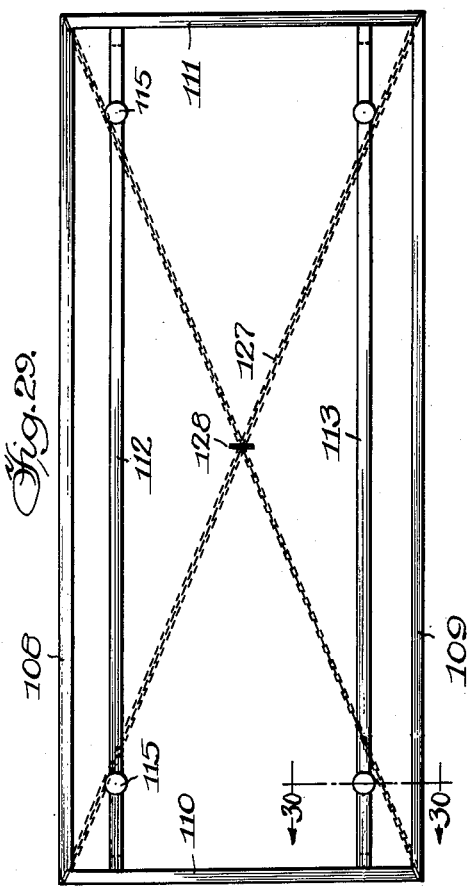
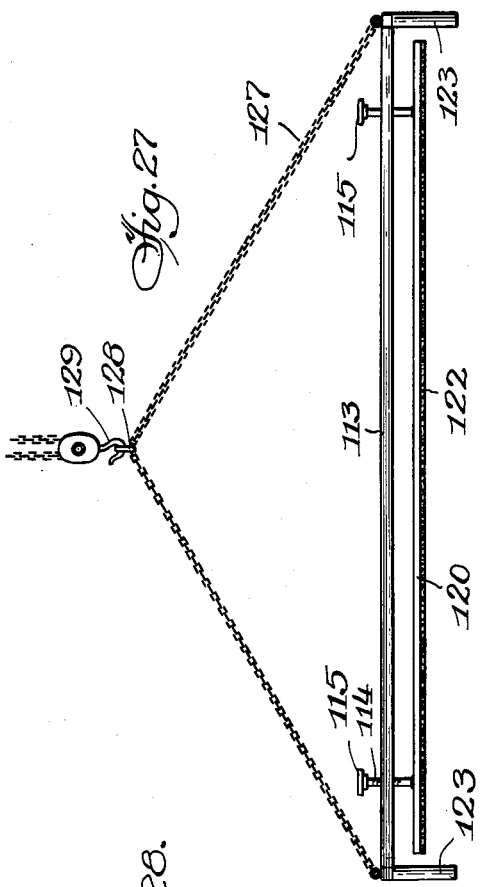
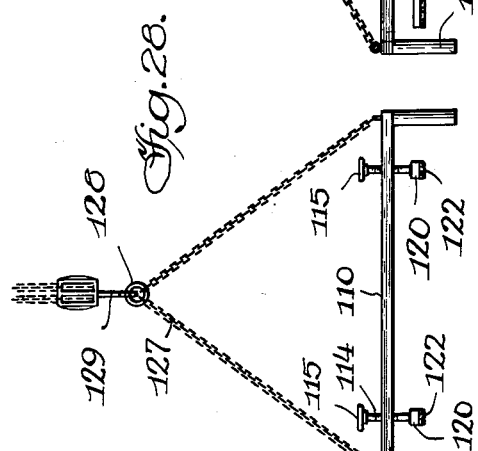
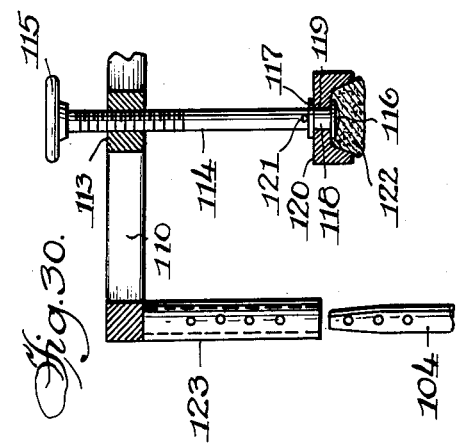
INVENTOR.
Robert Z. Drake
BY Chritton, Wiles, Schroeder, Merriam & Hofgren
Attys.

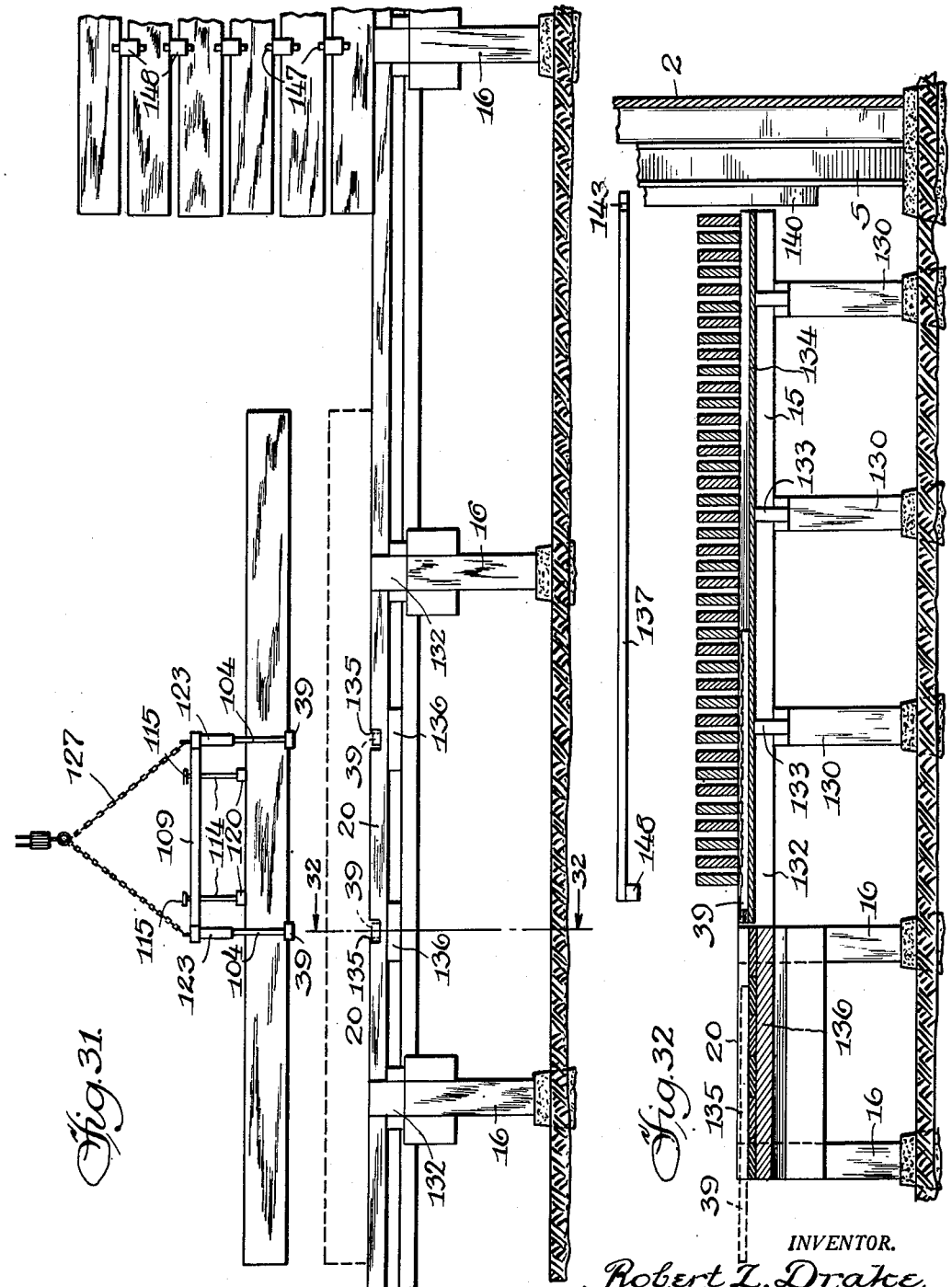

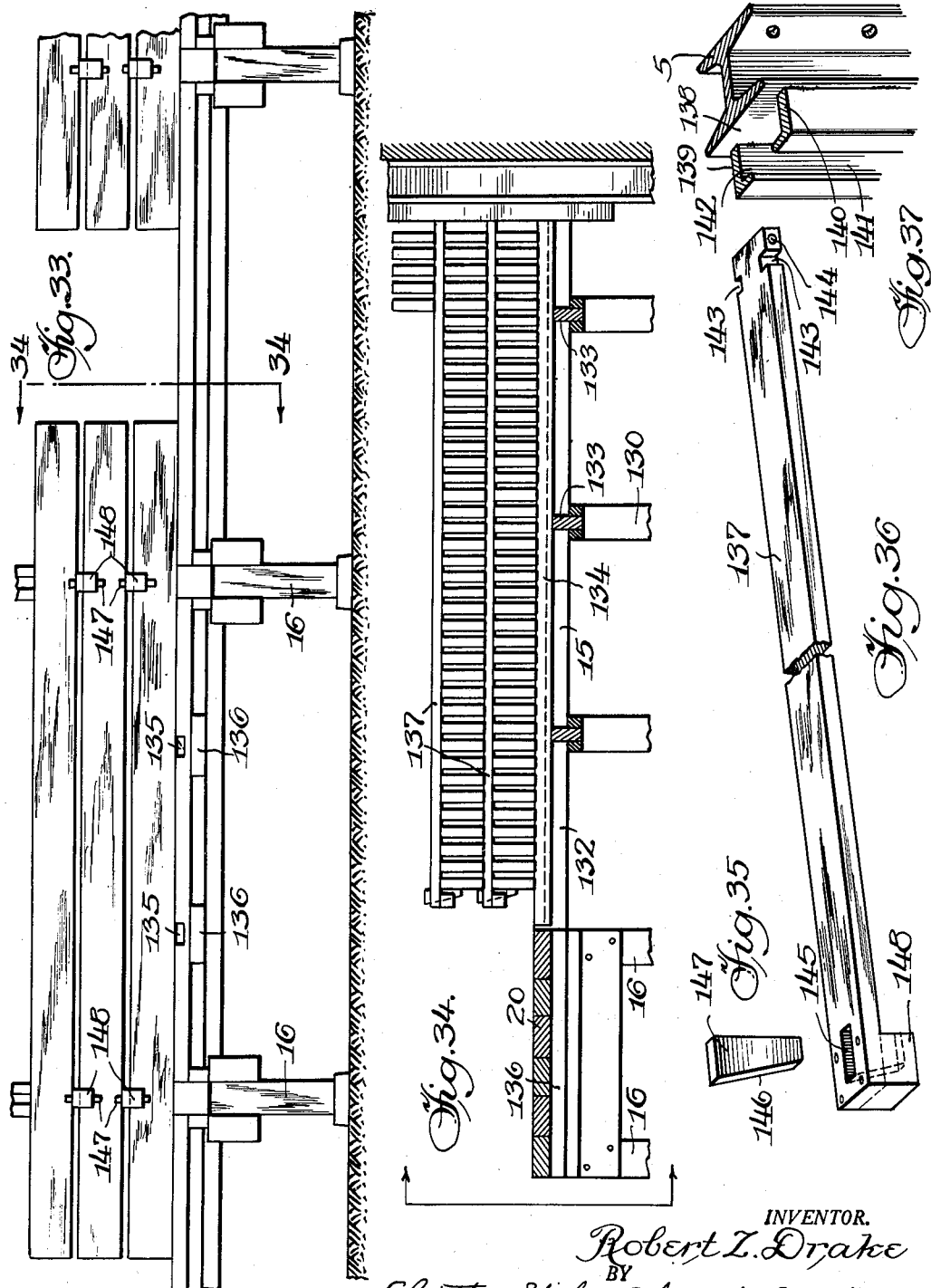

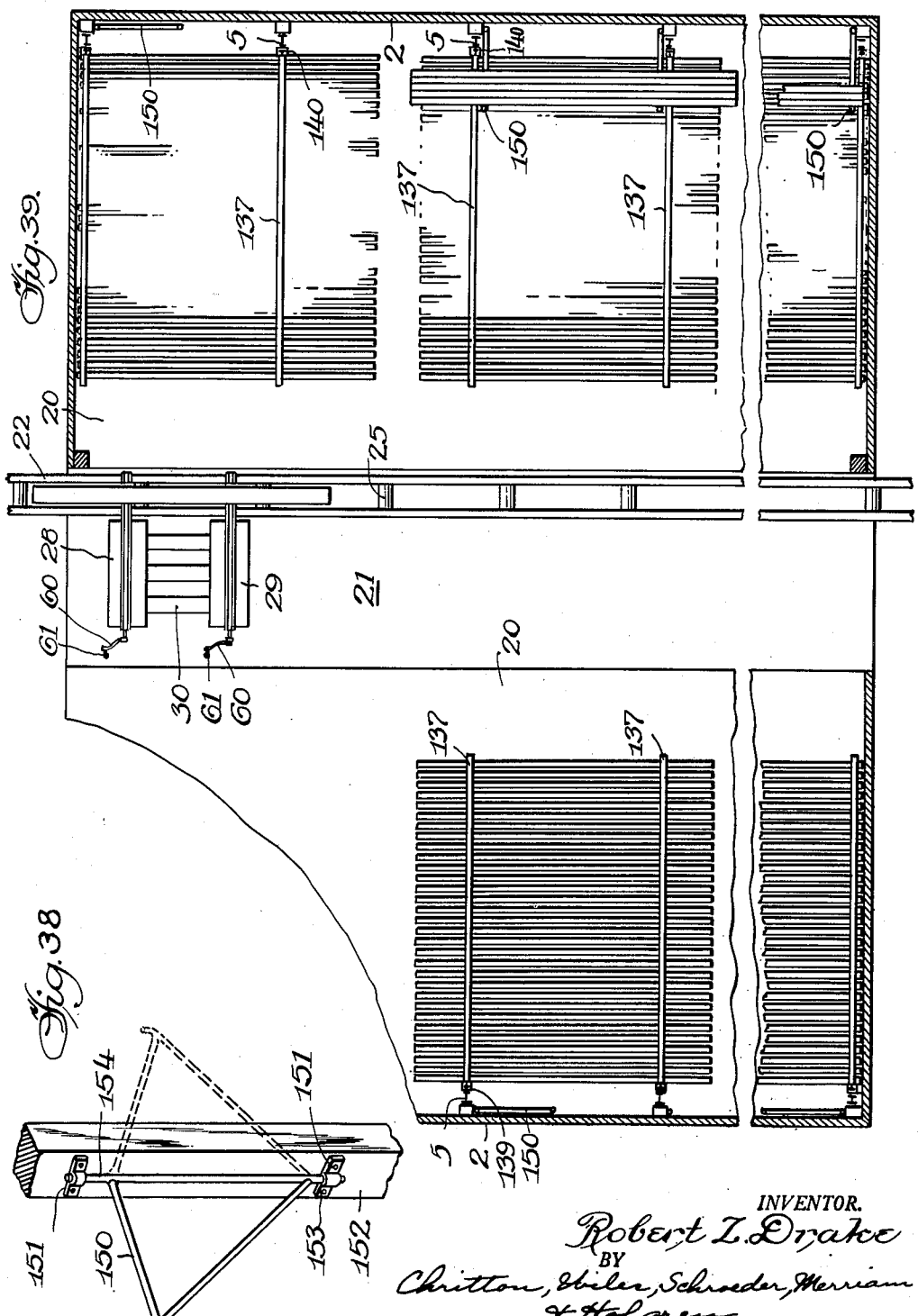

Patented Apr. 21, 1953

2,635,729

UNITED STATES PATENT OFFICE 2,635,729

APPARATUS FOR HANDLING AND STORING LUMBER

Robert Z. Drake, Omaha, Nebr.

Application October 24, 1945, Serial No. 624,225

8 Claims. (Cl. 193—36)

This invention relates to apparatus for handling and storing lumber, and more particularly to the handling and storing of lumber in a cold seasoning house in which the lumber is handled by stacking the pieces of lumber edgewise and leaving vertical spaces therebetween to act as air passages for the downward passage of air therethrough to effect the seasoning of the lumber.

In the invention of the present application I have provided novel apparatus for handling lumber whereby to facilitate and render more economical, less laborious and more safe, the task of so handling lumber that it may be stacked edgewise in a cold seasoning house.

Among the objects of my invention are: to provide novel and improved apparatus for handling lumber; to provide means for receiving blocks of horizontally positioned lumber, then transferring it laterally by novel mechanism into a device for turning the lumber on edge; to provide novel means for permitting the flatwise lumber to move longitudinally in the house and means to raise the flatwise lumber from its longitudinal carriers for moving the lumber laterally to the desired location; to provide novel mechanism for selectively raising and lowering the blocks of lumber, small amounts, during the operation of turning it from flat position to edgewise position; to provide novel means for transporting the transfer means and chassis thereof to any desired position longitudinally of the house; to provide a novel means for positioning the transfer means and chassis thereof when moving it to a new location, so that the same will properly register with the roll cases when lowered thereto; to provide a novel construction and arrangement of disk skids and combination thereof with the roll cases; and such further objects, advantages and capabilities, inherently possessed by my invention as will later more fully appear.

My invention further resides in the combination, construction and arrangement of parts illustrated in the accompanying drawings, and while I have shown therein, for illustrative purposes only, a preferred embodiment of apparatus for carrying out my invention, I wish it understood that the same are susceptible of modification and change without departing from the spirit of my invention.

In the drawings:

Fig. 1 is a vertical, transverse section of a seasoning house embodying my invention.

Fig. 2 is a fragmentary top plan view of a portion of a roll case and a portion of the disk skids, shown in operative relation to each other, and showing portions of the chassis tables.

Fig. 3 is a fragmentary longitudinal, vertical section on the line 3—3 of Fig. 2.

Fig. 4 is a fragmentary end elevation, partly broken away, of the spacer chassis, showing the roll case in transverse section, the disk skids in lowered position, and the guiding means for properly lowering the spacer chassis onto the roll cases.

Fig. 5 is a view similar to Fig. 4, but showing the disk skids in raised position, and showing in dotted lines a block of lumber moved on the disk skid rollers from the roll cases onto the spacer chassis.

Fig. 6 is a fragmentary top plan view of a portion of one of the chassis tables and the chassis guiding means for properly positioning the chassis with relation to the roll cases.

Fig. 9 is a fragmentary perspective view of a portion of a block of lumber about to be passed into the angles in the legs of the flipper.

Fig. 10 is a fragmentary perspective view of a portion of one of the flipper legs when standing in the position shown in Fig. 9 and a portion of the lower end of the flipper handle prior to the latter being inserted into the former.

Fig. 11 is a perspective view of one of the yoke members to be applied over the block of lumber just prior to flipping or turning the same to edgewise position.

Fig. 12 is a fragmentary transverse section through one of the chassis tables, one of the disk skids and the spacer bar and associated parts, with the block of lumber resting on the rollers of the disk skid with said rollers in elevated position when the block of lumber is in position to be passed into one of the legs of the flipper, this section being taken on the line 12—12 of Fig. 8.

Fig. 13 is a view similar to Fig. 12 but showing the lumber after it has been flipped to edgewise position and the flipper removed and the disk skid rollers in lowered position.

Fig. 14 is a fragmentary view looking toward the end of a block of lumber and showing the block of lumber on the flipper legs, the flipper strip underneath the flipper legs and the flipper handle about to be applied to the flipper legs.

Fig. 15 is a view similar to Fig. 14 but showing the flipper handle attached to the flipper legs and the block of lumber flipped to edgewise position.

Fig. 16 is a view similar to Fig. 15 but showing the yoke in position on the block of lumber, the block of lumber raised, and the flipper being removed therefrom.

Fig. 17 is a fragmentary side elevation of one of the spacer bars and showing some of the lumber positioned in the spacer bar notches and some of it not so spaced.

Fig. 18 is a fragmentary longitudinal vertical section through one end of one of the disk skids and taken on the line 18—18 of Fig. 19, showing the rollers in lowered position.

Fig. 19 is a fragmentary top plan view of a portion of the operating end of one of the disk skids.

Fig. 20 is a view similar to Fig. 18 but showing the disk skid rollers in elevated position.

Fig. 21 is a vertical transverse section on the line 21—21 of Fig. 20.

Fig. 22 is a perspective view looking at an angle toward the inner face of one of the chassis tables.

Fig. 23 is a fragmentary perspective view partly broken away showing one of the standards as about to be inserted into the connecting hole in one end of a spacer bar.

Fig. 24 is a fragmentary vertical longitudinal section through a portion of one end of one of the spacer bars showing the standard in position in the hole in the spacer bar.

Fig. 25 is a fragmentary bottom plan view of one end of one of the spacer bars and showing the plate at the upper side of the hole that receives the lifting standard.

Fig. 26 is a fragmentary side elevation of the spacer top with a group of planks held in position therein to be transported to the stack.

Fig. 27 is a side elevation of the spacer top showing the lifting chains and a portion of the hoist.

Fig. 28 is an end elevation of the parts shown in Fig. 27.

Fig. 29 is a top plan view of the spacer top but omitting the chains and hoist for convenience.

Fig. 30 is an enlarged fragmentary vertical section taken on the line 30—30 of Fig. 29 and showing a portion of one of the lifting standards about to enter the hole in one of the tubular corner members.

Fig. 31 is a fragmentary side elevation of a portion of the supporting foundation for the stack of lumber and showing a group of lumber being lowered on to the foundation to start the first course, and also showing a portion of some of the lower courses in an adjacent stack.

Fig. 32 is a vertical transverse section through the stack supporting foundation with the bottom course of edgewise pieces of lumber in position and showing one of the hanger bars about to be lowered thereover to hold the lumber against tilting edgewise.

Fig. 33 is a view similar to Fig. 31 without the spacer top, and showing the bottom three courses stacked in edgewise position with the hanger bars in position between the courses.

Fig. 34 is a vertical transverse section on the line 34—34 of Fig. 33.

Fig. 35 is a perspective view of one of the wedges to be inserted in the outer end of the hanger bar to hold the outer piece of lumber of that course in position.

Fig. 36 is a perspective view partly broken away of one of the hanger bars.

Fig. 37 is a fragmentary transverse section in offset planes through one of the vertical columns for supporting the hanger bars.

Fig. 38 is a perspective view of one of the hanger storing brackets attached to a portion of one of the vertical studding of the seasoning house.

Fig. 39 is a fragmentary top plan view partly broken away, in reduced scale of a plurality of the stacks of lumber and showing the chassis and roll cases in position in the longitudinal alley of the seasoning house.

*The seasoning house*

Figure 7:
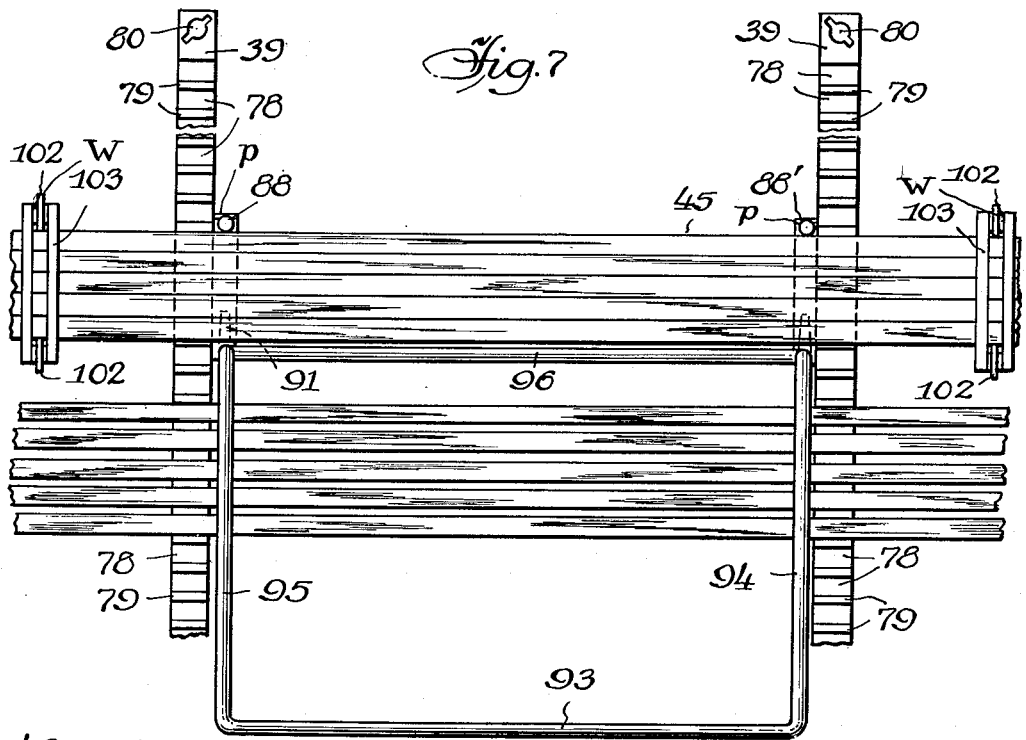
Fig. 7 is a fragmentary top plan view of a pair of spacer bars partly broken away, and showing the planks or pieces of lumber of one block spaced apart on the spacer bars and also showing a succeeding block of lumber that has been turned from flatwise to edgewise position prior to spacing, and showing the flipper in position after having turned the block edgewise.

In the form of my invention shown in the drawings, and referring first to Fig. 1, I have provided a seasoning house 1 comprising side walls 2, a roof 3, foundation members 4 which may be piling or other suitable foundation members which, if desired, may extend upwardly inside of the side walls in the form of fixed vertical columns 5 in the form of I-beams or structural supporting members suitable for the purpose intended. In the upper portion of the seasoning house is a travelling crane 6 suitably mounted for longitudinal movement along supporting rails 7 mounted upon longitudinally extending beams 8 supported by brackets 9 upon the upper portions of the vertical columns 5. Travelling crane 6 is provided with a travelling carriage 10 provided with the usual hoisting mechanism 11. Secured laterally across the upper ends of the vertical columns 5 are cross beams 12 spaced at suitable intervals along the length of the seasoning house, the space between these cross beams being left open to permit the passage of air freely downwardly therethrough. The super structure thereabove comprises truss members 13 supported upon which is the roof 3 having a large number of openings therein at spaced intervals, said openings being covered by adjustable hatch covers 14 which may be tilted in any desired direction to permit and encourage passage of air downwardly therethrough to the lumber stacks below. These hatch covers may be selectively tilted as desired to utilize the air currents outside of the seasoning house and at the same time protect the stacked lumber within the seasoning house from rain and other undesirable weather elements.

Near the bottom of the house are provided laterally extending cap timbers 15 spaced from each other longitudinally of the house and supported at their inner ends upon spaced apart pilings 16 connected together by cross timbers 17 upon which are mounted longitudinally extended joists 18 upon which are mounted a flooring, this structure extending longitudinally of the house. At the inner end portions of each of the cap timbers 15 are longitudinally extending planking 20 constituting walkways for the workmen working at the stacks of lumber. As noted in Fig. 1 the piling members 16 and walkways 20 are laterally spaced apart a distance to provide an alley 21 extending longitudinally the entire length of the house. Extending longitudinally along one side of this alley, closely adjacent one of the walkways 20 are roll cases 22 comprising upright legs at the upper ends of which are secured vertical side walls 24 within which are rotatably mounted rollers 25 spaced apart a suitable distance along the roll cases to enable the blocks of lumber to be moved longitudinally thereof from the outside of the house and along the full length of the house for purposes more fully explained hereinafter.

The upper surface of each of the rolls 25 is positioned upwardly a substantial distance above the longitudinal top edges of the side walls of the roll cases. These rolls are preferably provided with axles rotatably mounted in notches in the top edges of the side walls and there rotatably held in place by journal caps 26. Any other suitable bearing means may be used as desired for these rollers. By this construction a block of lumber consisting preferably of five (any other number may be used as desired depending upon the thickness) planks or pieces of lumber lying horizontally flatwise as seen in Fig. 3. These blocks of lumber may be pushed longitudinally along the roll cases, (this being easily facilitated by reason of the rotation of the rollers 25) from the outside of the seasoning house to the inside of the seasoning house, or throughout any desired length of the inside of the seasoning house, as conditions may require.

The chassis

Positioned in the alley 21, and capable of being moved to any desired longitudinal position in the alley, is a chassis 27 comprising two spaced apart chassis tables 28 and 29, rigidly connected together by any suitable bracing members and if desired provided with cross planking 30. One of these chassis tables, with the members securing it to the other table being omitted for the sake of clearness, is shown in Fig. 22, and comprises the top portion 31 and legs 32, 33 with strengthening braces 34. As seen in Fig. 22 legs 32 are set inwardly a substantial distance from the end of the table top, the other leg having its outer face preferably registering with the adjacent end of the table top. For convenience of manufacture and in order to provide a sturdy chassis table, each of these table tops is preferably formed of four heavy rectangular timbers and four complemental legs, these parts all being very rigidly secured together to form a strong, sturdy chassis table.

The relative position of these chassis tables with relation to each other and to the roll cases is seen in Fig. 2. Referring also to Figs. 12 and 13 it will be understood that along the inner edge of each of these chassis table tops is secured a timber 35 having in its upper inner edge a recess 36 within which is seated an elongated filler strip 37 for supporting flipper strip 38. Positioned upon the upper surface of timber 35 and just inside of the flipper strip 38 is a spacer bar 39 upon the upper surface of which is spaced the edgewise planks of lumber as later more fully described. As the other chassis table is a duplicate of the one now being described, except for reverse positioning of the parts, only one of these table tops will be here described in detail. Also positioned upon the upper side of the table top and a slight lateral distance away from timber 35 is a disk skid designated generally at 40 and described more fully hereinafter.

As shown in Fig. 2 each of the disk skids 40, at the end of the chassis tables adjacent the roll cases, extends beyond said table tops and across both of the roll case sides 24 between the upper edges of these roll case sides and the bottom face of the block of lumber being moved longitudinally over the roll case rollers 25, as best understood in Fig. 3, when the disk skids are in lowered position.

The disk skids

The disk skids referred to generally above, are preferably two in number, each comprising a lower stationary member 41 and an upper member 42 capable of up and down movement with relation to the lower member. As seen in Figs. 3, 12, 13, 18, 19 and 20, the lower stationary disk skid member 41 is preferably made up of an I-beam which rests upon the chassis table top extending the full length thereof and projecting beyond the chassis table top at both ends (see Figs. 4 and 5). Also as seen in Figs. 4 and 5 the bottom member 41 of the disk skid has pivoted thereto at 42', at suitable spaced distances along said lower member, a plurality of pairs of links 43, one link upon each side. Each of these links at its upper end is pivoted at 44, at suitably spaced intervals, to the upper disk skid movable member 42, which latter comprises an elongated channel member as will be best understood in Figs. 12 and 13. This link connection enables an up and down movement to be imparted to the upper member by swinging the links to a lower angular position as shown in Fig. 4 for the lower position of the top member, and to a more upright position as shown in Fig. 5 for elevating the upper member. This up and down movement of the upper member enables raising and lowering of the block of lumber 45, as desired, for carrying out the various steps described more fully hereinafter of handling the lumber preparatory to transferring it in edgewise position to the stacks. While this block of lumber may consist of any number of individual planks I have for illustrative purposes shown it in the drawing as consisting of five planks, $a$, $b$, $c$, $d$, and $e$ (see Fig. 5), each of which in the present illustration are approximately three inches thick.

Each of these disk skids (one on each chassis table top) has rotatably mounted on axles 46 in the upper side edges of the channel member 42 constituting the upper movable member, a series of rollers 47 so that when desired the block of lumber 45 may be moved laterally of the block, and longitudinally of the disk skids, to any position desired as will be understood in Figs. 4 and 5. The mechanism for elevating and lowering the upper member of the disk skids will be best understood in Figs. 18, 19 and 20, in which I have provided at the left hand end of the disk skids a pair of spaced apart steel cross bars 48 and 49 integrally connected at their ends to the side faces of the side flanges of the channel member constituting the upper movable member. Rollably mounted between cross bars 48 and 49 is a roller 50 capable of pushing the cross bars and upper channel member forwardly and rearwardly by means of a block 51 having extending prongs 52 between which prongs is mounted a shaft 53 upon which the roller 50 is mounted.

Extending through a hole in block 51 is a shaft 54 having at its rear end a nut 55 for tightening and loosening the adjacent parts against the ball bearing thrust members 56 and 57. Just to the left of the ball bearing thrust members 57, as viewed in Fig. 20, is an enlarged diameter 58 of shaft 54, which has contact with the adjacent ball bearing member. Shaft 54 further extends to the left as viewed in Fig. 20 in the form of an enlarged threaded member 59 having fixed upon its outer end a crank handle 60 provided with a handle 61 for imparting rotation thereto.

As seen in Fig. 19 a bar 62 is integrally fixed at its ends to the upper portion of the inner side faces of the vertical flanges of the lower stationary member 41, and below bar 62 is secured a metal block 63 having an interior threaded opening 64, the threads of which interengage with the threads on the threaded shaft 59. Block 63 is fixed to the bottom bar 65, likewise extending between the lower portions of the flange sides, by screw 66, and to the top bar 62 by a key 67 to prevent rotation of the same.

As will be seen in Figs. 18, 19 and 20 the web 68 of the bottom I-beam is cut out for distance back of the shaft 54 so as to afford room for a limited forward and rearward movement of this shaft. This will be further understood in Fig. 21. From this construction it will be seen that as the handle 61 is rotated in one direction the bearing roller 58 will push against cross bar 48 and move the upper member of the disk skids rearwardly to the lower position shown in Fig. 18, at which time the bearing roller 58 will be in the upper portion of the space between cross bars 48 and 49, by reason of these cross bars having been lowered with relation to the bearing roller. At this time the web 69 of the upper channel member will rest against the web 68 of the I-beam with the upper movable member of the disk skids in its maximum lowered position as seen in Figs. 13 and 18. Rotation of the handle 61 in the opposite direction will move the bearing roller 58 forwardly and carry with it the upper movable member by reason of the cross bars 48 and 49 being secured to the upper channel member. This will move the upper member longitudinally forwardly with relation to the stationary bottom member and move the links 43 to more nearly an upright position as shown in Fig. 20 which will elevate the upper member of the disk skids and at the same time elevate a block of lumber if the same is positioned on the rollers 47.

By this construction I am enabled to raise and lower the block of lumber upon the top of the disk skids and selectively move the same sidewise of the planks along the disk skid rollers as desired for a purpose that will later more fully appear. If desired the pivot members 42' and 44 at the lower and upper ends of the links 43 may be short shafts 70 having nuts 71 and 72 threaded upon their ends to secure the links in proper position against the side face of the upper and lower members. Each of these links has an inwardly extending projection 73 at its upper end because of the outer vertical faces of the upper channel member being spaced inwardly from the outer vertical faces of the stationary bottom member. The right hand end of each of the disk skids as viewed in Figs. 4 and 5, which extends over the roll case, is provided at its outer end with a notch 74 which seats over the upper edge of the right hand roll case side member 24. Also provided in the lower face of the lower stationary disk skid member 41 is a notch 75 which seats over the upper edge of the other roll case side member 24. By the use of these two notches I am able to properly position the disk skids with relation to the roll cases. The opposite end of each of the disk skids is extended a short distance beyond the adjacent end of the chassis table top so as to position the crank 60 and crank handle 61 for easy manipulation during handling of the lumber.

The flipper strips

As stated above there is positioned above the filling strip 37 an elongated flipper strip 38 which is preferably squared in cross section and of very hard wood such as ironwood or the like. This flipper strip in each of its end portions in each of its four side faces is provided with a hole 76 to receive a pin 77 fixed one at each end of the strip 37, so as to position each of the flipper strips in position against later slipping regardless of which of its four side faces is at the top. This enables me to selectively turn the flipper strip from one side to the other as any one side becomes unduly worn from use. Being of hardwood, these flipper strips as will be understood will last a long time. Positioned upon the top face of each of the flipper strips is a leg of the flipper, as will be later more fully explained, which flippers may be applied to the flipper strips at any desired longitudinal location thereof and removed therefrom when desired. As will be more fully understood later the thickness or height of these flipper strips is slightly less than the thickness of the spacer bars at the bottom of the notches therein.

The spacer bars

Positioned upon the top of the timbers 35 and just inside of the inner edge of the flipper strips, on each of the chassis table tops, is a spacer bar 39 having on its upper face throughout the greater portion of its length a number of equally spaced notches 78, there being between each of these notches a small upstanding rib 79 so that the planks after being flipped from flatwise to edgewise position may be positioned one in each of these notches at uniformly spaced distances apart as will be understood in Fig. 17. Spacer bars 39 are not fastened to timbers 35 but rest loosely thereon so that when the standards are fastened to the spacer bars these spacer bars, with the spaced edgewise lumber positioned thereon, may be lifted upwardly from the chassis tables and carried to the stacks by the spacer top as later more fully described.

In each end of each spacer bar 39 (see Fig. 23) is an opening 80 extending downwardly from the upper face thereof and having at diametrically opposite points slots 81 and 82 which open into a rectangular recess 83 formed in the lower half of the spacer bar. Positioned against the upper face of recess 83 is a square metal plate 84 having corner openings 85 for receiving screws or other fastening means for securing the same to the spacer bar, which spacer bars are each preferably formed of metal. Plate 84 is likewise formed with diametrically opposite slots 81' and 82' to receive prongs on the bottom of the lifting standards later more fully described. Formed on the lower face of plate 84 are a pair of oppositely positioned downwardly extending shoulders 86 and 87 against which the projections on the standards abut as later explained.

The flipper and yoke members

As stated above a flipper is suitably positioned upon the upper faces of the flipper strips 38 for turning the block of lumber from flatwise to edgewise position. This flipper is shown in Fig. 9 and constitutes a bottom member having the legs 88 and 89 on one side and corresponding legs 88' and 89' on the other side. In other words, one pair of these legs is for cooperation with one of the flipper strips and the other pair of legs is for cooperation with the other flipper strip. Formed in the upper end of each of the vertical legs 89 and 89', which legs are preferably formed at an angle of 90° with relation to legs 88 and 88', is a conical opening 90, to removably receive the conical projecting end 91 formed on each side of the bottom portion of the flipper handle 92 as viewed in Fig. 9. This flipper handle, when in the position shown in Fig. 9, has a cross bar 93 corresponding in length to the distance the flipper strips are apart, and having at its ends the downwardly extending rods 94 and 95 preferably connected together at their lower ends by the brace rod 96. Where the brace rod 96 connects with the bottom ends of the side rods 94, 95 the latter are extended at approximately 90° to form extensions 97 and 98, the downwardly extending conical ends 91 being preferably formed on the outer end of extensions 97, 98, and at 90° thereto. This provides a flipper which is separable into three parts, the upper part 93—98 and the two lower leg portions 88—89', the upper or handle part being easily attached to the lower leg portions by inserting the conical ends 91 into the conical openings 90.

Figure 8:
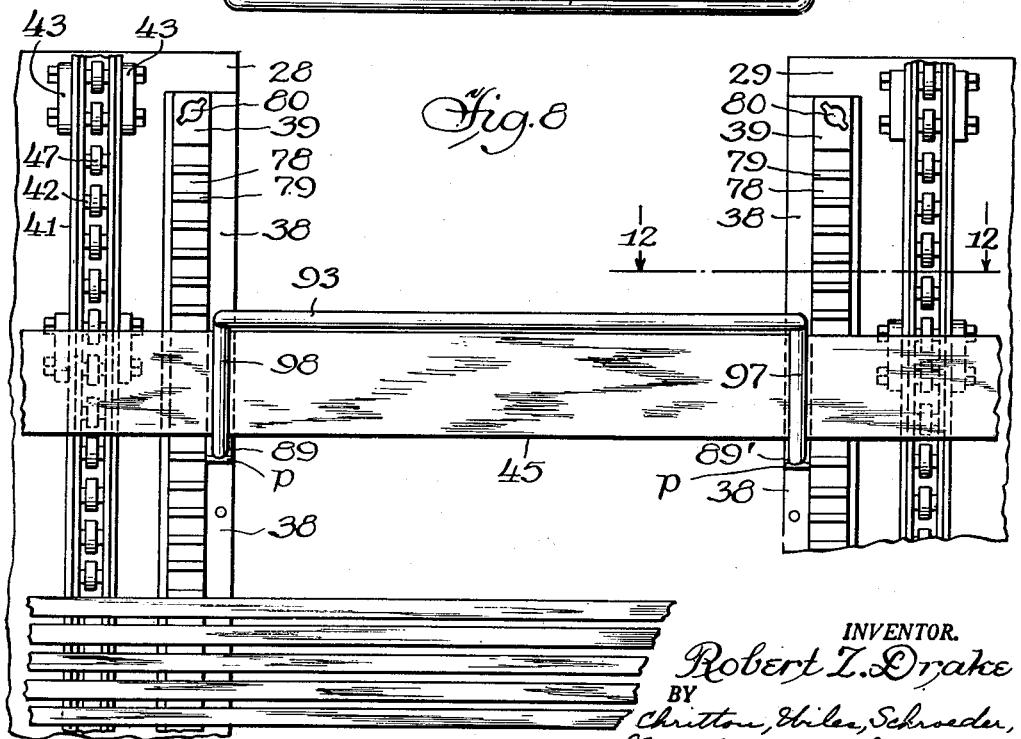
Fig. 8 is a view similar to Fig. 7 but also showing portions of the chassis tables and the disk skids and a block of lumber with the flipper applied thereto prior to being turned to bring the planks to edgewise position.

This flipper, when the lumber is to be flipped, is positioned with the legs 88, 88' resting upon the two flipper strips 38 respectively, with the interior angle of the legs opening toward the roll cases so that when the block of lumber is moved laterally from the roll cases to the flipper, it will pass into the interior angle of the legs of the flipper, it being understood that the upper movable member of the disk skids will have been raised a sufficient amount to clear the lower face of the bottom plank of the block of lumber with relation to the upper surface of the bottom flipper legs 88 and 88'. These last mentioned legs when in position on the flipper strips will have their upper faces a slight distance above the upper ends of the ribs 79 of the spacer bars so that the lumber will clear these ribs while being moved into the angular opening in the flipper. As soon as the block of lumber has entered the full distance into said angular opening in the flipper the upper member of the disk skids will be lowered until the bottom plank of the block of lumber rests upon the upper surface of the legs 88 and 88' of the flipper. At this time the flipper handle, which prior thereto may be left off if desired, is applied to the legs by inserting the conical legs 91 into the conical openings 90 and the device is then in the position shown in Fig. 8 and ready to flip the block of lumber from flatwise to edgewise position. An angle plate $p$ is preferably secured to the exterior of each of the legs 88, 89 and 88', 89' where they meet to give added strength and stability.

This flipping action is accomplished by pulling rearwardly on the upper handle member 93 which rocks the flipper legs about the two corners 99 and 100 on the flipper strips, causing the upright legs 89 and 89' (see Figs. 9 and 14) to rock to horizontal position (see Fig. 15), which movement carries the planks of lumber from flatwise to edgewise position. The device and the lumber is then in the position shown in the upper part of Fig. 7. In each of Figs. 7 and 8 the flipper and block of lumber is shown as succeeding a previous block of lumber in which the planks were in a similar manner moved from flatwise to edgewise position, and manually moved by hand into the respective notches 78 of the spacer bars 39. It should be mentioned that after the block of lumber enters the angular opening in the flipper and prior to being flipped to edgewise position, two or more yoke members 101 (see Fig. 11) are positioned over the block of lumber to hold the respective plank in the block against slipping with relation to each other during the flipping action. Each of these yoke members consists of a pair of legs 102 secured between a pair of cross members 103 by bolts or other suitable fastening means, it being understood that the parts constituting these yoke members are of sufficient sturdy size and construction for the purpose intended. In order to satisfactorily fasten the yoke members to the block of lumber to hold the planks together against slipping during the flipping action, each of the legs 102 on their inner face is formed with a longitudinal tapered slot to receive the tapered wedge W whose inner edge is parallel with the side face of the block of lumber. These wedges when driven longitudinally will grip the planks together.

Referring now to Fig. 7 in which the block of lumber shown in the upper part of this figure has been flipped to vertical position, the handle portion 93—98 of the flipper is next pulled to the left (downwardly as viewed in Fig. 7) to remove the tapered ends 91 from the tapered openings 90 and permit the handle portion of the flipper to be separated from the leg portions and removed from between the block of lumber and the next preceding plank of lumber. The leg members 88—89' are then pulled to the right (upwardly as viewed in Fig. 7) to remove them from underneath the block of lumber, it being understood that just prior to this last step the upper member of the disk skids has been elevated a slight distance to free the bottom edges of the planks of lumber from the leg members 89—89'.

As will be understood, when the first block of lumber is moved along the disk skids the flipper will be positioned close enough to the end of the flipper strips to enable the lumber to be flipped and be in a close position to the far or outer end of the spacer bars to enable the respective planks of lumber, after the block has been flipped, to be easily and manually moved into the first and successive notches 78 of the spacer bar. This will mean that five, or any other desired number of planks in the block, will be standing edgewise in the successive notches of the spacer bars. When another block of lumber is moved along the disk skids it will be so positioned that after being flipped it will be far enough away from the last plank of the previously spaced planks to permit the flipper to be removed therefrom after the block of lumber has been flipped from flatwise to edgewise position, as will be seen in Fig. 7.

These flipping steps will perhaps be better understood by referring to Figs. 14–16, in which Fig. 14 shows the block of lumber as having entered the angle between the leg members and then lowered upon the bottom ones of these leg members, and the handle member of the flipper about to be attached to the flipper leg members just prior to flipping of the block of lumber. In Fig. 15 the flipping has taken place and the planks in the block of lumber are now positioned edgewise but resting upon the now lower leg of the flipper legs. In Fig. 16 the upper part of the disk skids has been elevated a slight amount to clear the bottom edges of the planks of the block of lumber and the handle portion of the flipper has been pulled out from one side and the legs of the flipper are being pulled out from underneath the block of lumber at the other side.

The upper member of the disk skids is then lowered to bring the bottom edges of the planks of lumber against the upper surface of the spacer bars and the yoke members removed from the block. The lumber will then be in approximately the position shown toward the right side of Fig. 17. The planks of lumber are then manually moved to the left to the proper notch 78 to space the planks of lumber successively along the spacer bar. As soon as a sufficient number of said blocks of lumber have been moved along the disk skids, flipped, and spaced successively in the notches of the spacer bars so as to fill said notches with spaced edgewise lumber, the spacer bars are then in position with their load of edgewise positioned lumber to be transported to the lumber stack as later more fully described.

*The standards, spacer top and hoist*

When the spacer bars are loaded with edgewise positioned lumber as described above, one of the standards 104 is inserted into the opening 80 and rotated through approximately 90° in each end of the spacer bars. Each of these four standards is of metal and formed with an upper tapering end 105 with a series of laterally extending holes 106 to receive pins for securing the upper ends of the standards to the spacer top as later more fully described. Each of these four standards 104 is provided at its lower end with a pair of diametrically extending prongs 107, which when the standard is lowered into the hole in the end of the spacer bar, pass through the notches or slots 81 and 82. When prongs 107 have passed downwardly beyond notches 81, 82 the standard is then rotated in a clockwise direction as viewed in Fig. 25 to cause projections 107 to strike shoulders 86 and 87 after which projections 107 will bear against the bottom edge of metal plate 84 and enable the spacer bars with their load to be elevated as later described. Later after the edgewise positioned planks have been placed on the stack and the spacer top loosened the standards 104 may be rotated in the opposite direction until projections 107 register with slots 81 and 82 at which time the standards may be removed from the spacer bars by an upward pull.

There are also provided means for connecting to the top ends of the standards for providing a supporting means for lifting a pair of spacer bars with their edgewise positioned planks of lumber, for transporting these edgewise planks to the stack. This means I refer to as a spacer top which is shown in operative position in Figs. 1 and 31 and in detail in Figs. 26–30. In Fig. 29 this spacer top is shown to comprise longitudinally extending side members 108, 109 and a pair of end members 110 and 111 integrally connected to the side members to form a rectangular frame. Extending longitudinally of the spacer top and integrally connected to the end members 110, 111, and spaced inwardly a distance from the side members 108, 109 are a pair of elongated bars 112, 113, all of these parts being of sufficiently rigid construction to function as described. Each of bars 112, 113 near their respective ends are provided with vertically extending screw threaded openings each threadably receiving a screw threaded rod 114 having at its top a rotating handle 115, which upon rotation in a desired direction will elevate or lower these rods depending upon the direction of rotation.

Formed upon the lower end of each of rods 114 is an annular flange 116 and spaced a short distance thereabove is a collar 117 removably secured to the rod. The portion 118 of this rod, between flange 116 and collar 117 is rotatably positioned in an opening 119 formed in the longitudinally extending floating bar 120, it being understood, as shown in Fig. 27, that there is one of these floating bars supported by two of the rods 114 below each of the bars 112, 113. As the rod 114 and its connection to the upper and lower bars is identical for each of these four rods, only one of them is described. In order to enable collar 117 to be positioned above the floating bar 120 there is provided a pin 121 extending laterally through an opening in the rod 114 just above this collar, so that the rod may be inserted through the floating bar 120 until flange 116 contacts the lower face of the channel thereof, after which collar 117 may be slid on from the other end of the rod prior to fixing the handle 115 thereto (by a set screw, key or the like), and when in proper position the pin 121 will be inserted above collar 117. This enables rotation of rod 114 in the floating bar and at the same time enables pressure to be applied to the floating bar in a downward direction and also enables this floating bar to be elevated when desired by rotating the threaded rod 114 in the appropriate direction.

Fixed within the channel in the lower face of the floating bar 120 is an elongated cushion member 122 of yieldable material such as felt or the like, which may be pressed downwardly upon the upper edges of the edgewise positioned planks on the spacer bars and be slightly indented to hold said planks in such edgewise position against tilting, as will be understood in Fig. 26.

Depending from each of the four corners of the spacer top frame and rigidly fixed thereto is a tubular member 123, of a size to receive the upper ends of the standards 104 when the spacer top is lowered into position thereover. These tubular members 123 are each provided with a series of holes 124, which may be brought into registry with any desired one of the holes 106 in each of the standards and a pin member 125 inserted through the registering holes in the tubular member and the standard top, to fix the spacer top, the standards, and the spacer bars together as a unit. After the pin member 125 (preferably having an eyelet secured by a chain 126 to the spacer top to prevent losing it) is in place, the screws 114 are then lowered by rotating the handles 115 to press the felt members 122 against the upper edges of the planks positioned on the spacer bars. As will be understood in Fig. 26 this enables the laterally spaced edgewise planks on the spacer bars to be held against any possibility of tilting sidewise while these planks and spacer bars are being transferred to the stack.

Fixed to the upper side of each of the four corners of the rectangular frame of the spacer top is a chain 127, these chains extending upwardly at a suitable angle and converging to the center as will be understood in Figs. 27 and 28. At their center connecting ends they are provided with a ring 128 to receive the hook 129 of the hoisting mechanism 11 carried by the crane which is movable longitudinally of the house, the hoisting carriage 10 being also movable laterally of the house. A motor or other suitable power means may be used for lifting and lowering the hoisting mechanism and moving the same to different positions in the house for carrying out the stacking and unstacking operations. If desired the carriage 10 may be moved along the crane girder 6 manually by swinging the supported load to its desired position.

Assuming that the planks of lumber have been moved to the desired location on the disk skids, flipped, and positioned edgewise to fill all of the notches in the spacer bars, the standards secured one in each end of the spacer bars, and the spacer top secured to the standards as described above, with the felt strip pressing upon the plank upper edges, the group of edgewise planks on the spacer bars is then transferred by the hoist to the stack as later more fully described.

The stack foundation

The stack supporting foundation for each of the stacks in the seasoning house, as shown in Figs. 31–34, comprises any suitable number of intermediate piling 130 (three at each end of each stack being shown for illustrative purposes) in addition to the piling 16 for supporting each of the walkways 20. These piling 130 and 16 in each of the transverse rows on each side of the seasoning house are in alinement with each other as will be understood in Figs. 32 and 33. Secured to extend along the top of each of these last mentioned piling in each row, laterally of the house, are heavy timbers 132 preferably extending from the front edge of the walkway to the rear side of the stack, so that the upper edge of these timbers 132 are in horizontal alinement with the top surface of the walkway. The spacing of these timbers 132 and the piling upon which they are supported, longitudinally of the house will be understood in Fig. 31.

Extending in a direction longitudinally of the house from each of the piling 130 to the complemental piling of the next adjacent row, is a sturdy joist timber 133, the upper edge of each of which is at a distance below the upper edge of the main stack supporting timbers 132. Positioned upon the upper edges of joist timbers 133 is a pair of channel members 134 which extend from just inside of the walkway 20 to the rear side of the stack. The channel in this channel member, opens upwardly, extends throughout the length thereof and is open at both ends. Two of these channel members are positioned between each of the two rows of piling 130 and are spaced apart a distance equal to the distance between the spacing bars, so that when the two spacing bars and the edgewise positioned planks are placed upon the stack foundation by means of the spacer top and the hoist, the lower edges of this group of edgewise planks will rest on the top edges of timbers 132, and the spacer bars will freely enter into the channels of the channel members 134 without interfering with the lower edges of the planks resting on timbers 132 as will be understood in Fig. 31. In Fig. 31 the group of planks are shown in elevated position in solid lines just before being placed upon the timbers 132, in dotted lines after being so placed, and the spacer bars are shown in dotted lines in the channels of the channel members 134.

A pair of notches 135 are cut laterally across the walkway opposite each stack, each of these notches being in alinement with the channel in each of the channel members 134. By this arrangement, when the spacer top has been loosened and disengaged from this group of edgewise planks by removing pins in the corner tubular members of the spacer top so as to release the standards, the spacer top may be removed by the hoist and the standards rotated to position to bring their prongs in alinement with the notches 81, 82 in the spacer bars and removed therefrom by being lifted upwardly by hand. The two spacer bars may then be pulled forwardly out of the channels in the channel members 134 and through the slots 135 in the walkway so that these channel members may be returned to the chassis for receiving another group of planks.

Directly below each of the slots 135 extending crosswise of the walkway planks, is secured a reenforcing plank 136 extending across the underside of the walkway, to offset the loss of strength occasioned by formation of these slots. It will be understood that in the construction of this stack foundation, reenforcing parts will be used as desired without describing all of them in detail. Such additional strengthening and supporting parts, outside of the novel features referred to herein, may be of conventional form. As the stack foundation construction is the same beneath each of the stacks on both sides of the house, only one of them has been described in detail. The removal of the spacer bars from the channels in the channel members 134 applies, as will be understood, to only the first course of edgewise planks in the stack. Between the remaining courses the spacer bars may be removed longitudinally without difficulty, as their total height is somewhat less than the thickness of the hanger bars described more fully hereinafter.

The hanger bars

As soon as the first course of edgewise planks has been positioned upon the stack foundation (see Fig. 32), two or more hanger bars 137 will be positioned laterally across the top edges of the plank in said first course to prevent them from tilting sidewise. The construction of these hanger bars and their associated parts, will be more fully understood by reference to Figs. 35–37. As seen in Fig. 37 the upright columns 5 are of I-beam construction, there being fixed by welding or otherwise as desired, to the inner face 138 a pair of spaced apart angle irons 139 and 140, so positioned as to provide the vertically extending slot 141, and the hollow space 142 between the inner face of the I-beam and the flanges.

These angle irons will extend to as high a position in the seasoning house as it is desired to carry the stacks so that they will be available for also supporting the topmost hangers in the top course. Each of the hangers 137 is formed on each side adjacent the rear end with a pair of oppositely positioned notches 143, there being, if desired, a bolt 144 or other suitable reenforcing means passed through the rear end of the hanger bar so as to prevent the projecting neck from becoming broken in use. At the outer end of each of these hanger bars is formed a rectangular slot 145, the outer wall of which is inclined to receive the inclined edge 146 of the wedge block 147. Just below slot 145 is a hanger head 148 through which also extends the tapered slot referred to above.

Assuming the first course of edgewise positioned planks to be in place as shown in Fig. 32, as soon as the spacer top is removed therefrom as described above, the workman immediately picks up one of these hanger bars and after turning it vertically edgewise, inserts its rear end through the slot 141 between the angle irons and then rotates it to a horizontal position edgewise so that the notches 143 receive the adjacent edges of the angle iron flanges forming the slot 141, which prevents the hanger bar from being pulled outwardly away from the supporting columns. As soon as the hanger bar has been thus promptly positioned it is quickly laid down across the upper edges of the plank in the first course with the hanger head 148 just outside of the outside plank. This immediately braces all of the plank in this course and prevents them from tilting sidewise. As soon as the hanger bar has been thus positioned the wedge block 147 is inserted into the slot 145, the inclined edge 146 and the corresponding edge in the slot 145 causing the vertical inner face 149 of this wedge block to have its lower portion rest against the outer face of the outside plank of the bottom course and the upper inside edge in position to receive the bottom edge of the outside plank of the second course. It will be understood that two or more (as desired) of these hanger bars will be placed across the top of each course. When the second course has been stacked in a manner similar to that described above in connection with the first course, similar hanger bars will immediately be positioned across the upper edges of the planks of the second course after the spacer bars have been removed therefrom (the planks resting on the hanger bars of the first course), in the same manner as described above in connection with the two or more hanger bars applied to the bottom course. In each of the hanger bars at the top of the second course similar tapered wedge blocks 147 will be inserted in the slots 145 to help support the stack as described above.

It is important to note as seen in Fig. 34 that the edgewise positioned planks of the second course will be so positioned above the hanger bars of the first course as to bring the side faces of superposed planks in vertical alinement with the side faces of the plank below. This is continued throughout the height of the stack so that the side faces of all of the planks in each tier will be in vertical alinement to create vertical spaces between adjacent planks to permit the passage of outside air from the top of the stack down through these spaces to the bottom of the stack to cold season the lumber. As stated above, when the second and any succeeding course of lumber is positioned upon the hanger bars immediately therebelow, the spacer bars may be removed after the spacer top and the standards have been removed, by merely pulling these spacer bars longitudinally out from between the courses, which is permitted by the thickness of the hanger bars. For this reason the hanger bars are so positioned on each course that they will not be in the way of the spacer bars when lowered thereon. This will be understood in Fig. 33.

*The hanger brackets*

In order to eliminate the loss of time that would be otherwise required to have the hanger bars handed up from the walkway to the man on top of the stack, I have provided a series of swingable hanger brackets pivotally mounted upon the inner faces of the housing sides upon studding or the like as shown in Figs. 1, 38 and 39. As the stack progresses in height these brackets will be successively swung flatwise against the side of the house as the hanger bars thereon will have been used up. When a stack is to be built, these brackets will be swung outwardly at approximately right angles to the side of the house as shown in Fig. 1, and upon the upper bar 150 of each pair of these brackets are piled any desired number of hanger bars 137. As the building of the stack of edgewise positioned lumber proceeds the workman will pick up two or more of these hangers, as required for each course, and lay them one at a time across the upper edge of such course in the manner described above. When the next course has been laid he will likewise pick up the necessary number of hangers in succession, from the brackets 150, and lay them across that course. As soon as the stack has grown to the height to render them unnecessary the lower pair of brackets will be swung back against the side of the house and so on as the stack continues to grow.

As shown in Fig. 38 these hanger bars are pivotally mounted in bearing members 151 upon the upright studding 152, or other suitable members in the house side wall. Fixed to the bottom end of the bracket is a collar 153 which bears against the upper edge of its bearing member 151, there being provided a straight portion 154 at the top of sufficient length to permit the bracket to move upwardly to clear the bottom end from its bearing member and then be removed or reinserted as desired. In Fig. 38 the bracket is shown in solid lines as swung outwardly in position to receive the hanger bars in cooperation with an adjacent bracket, and is shown in dotted lines as swung back parallel with the side of the house to be out of the way of the stack. In addition to being a matter of convenience the purpose of these hanger brackets is, that the workman has to work fast with a newly laid course of edgewise positioned planks, so as to lay one or more hanger bars on such course before any one of the edgewise positioned planks is pushed over thus causing the entire course to collapse like dominoes. By having these hangers closely available on the brackets no time is lost in applying these hangers to the various courses.

*The chassis spotting device*

As will be understood, in the seasoning house, it is necessary from time to time to move the chassis from one position to another longitudinally of the alley in the house. In order that this may be done, and at the same time bring the chassis to a correct position with relation to the roll cases, I have provided what I term a chassis spotting device. This comprises a plurality of guide members 155 as shown in Figs. 4–6. These guide members comprise an angle plate having a flat portion 156 fastened by bolts or the like to the inner side face of the roll case. This angle plate has an outstanding rectangularly positioned member 157 positioned at right angles thereto. Fixed to the outer face of the angle member 157 is a short length of angle iron so positioned that one angle 156' is bolted or otherwise fixed by bolts 158 to angle member 157, and the other angle 159 of which inclines inwardly and downwardly to provide an inclined plane 160.

Any suitable number of these guide members 155 will be positioned at desired locations longitudinally along the inside face of the roll cases, and when the chassis is picked up by the hoisting means it may be moved to any new location and when lowered the inside corner edges 161 of the chassis table tops will contact the inclined face 160 of the angle irons 156, and be guided downwardly and inwardly as the chassis is lowered, to ultimately bring the notches 74 and 75 into position to fit over the top edges of the side members 24 of the roll cases. This will be made possible by so spacing each pair of spotting or guide members that the bottom corners of the chassis table top will meet and slide down these inclined surfaces, thus insuring that the chassis will be properly positioned when being lowered into a new position.

One means for hoisting the chassis and moving it to a new position by means of a hoist is to provide four holes with diametrically opposite slots or notches (similar to those in each end of each of the spacer bars shown in Fig. 23) at four properly located positions in each of the chassis table tops, then insert one of the standards in each of these four holes, rotate the standard until the projections strike the shoulders in the holes in the same manner as in the spacer bars, then attach the spacer top to the standards, and with the hoist elevate the chassis, move it to a new position and lower it against the spotting devices described above. Such holes may be positioned at any desired and suitable locations in the table tops, as for example they may pass through the timbers 35 and continue down through (or partway through) the table tops and at their lower ends be provided with striking shoulders against which the prongs 107 of the standard strike, this construction being similar to that in the ends of the spacer bars (see Figs. 23-25). One of these chassis table top holes is indicated in dotted lines in Fig. 13, and which holes are not shown in detail as they are of the same construction as those at each end of the spacer bars shown in detail in Figs. 23, 24 and 25. Or if desired, cables, chains or the like may be looped around the chassis tables with portions leading to the yoke of the hoist and the chassis raised and lowered for changing its position by the hoist connected thereto.

*Operation and method steps*

From the above it will be seen that the operation of my improved apparatus is as follows:

The block of lumber (which as stated may consist of any number of planks, preferably five if sufficiently thick) is placed flatwise upon the roll cases at a point outside of the seasoning house (or inside as desired), and pushed longitudinally along the roll cases until it comes opposite the chassis and is properly located with relation to the pair of disk skids. As the block of lumber is moving longitudinally along the roll case adjacent the chassis the upper member of the disk skid will have been previously lowered a sufficient amount that the bottom plank of the block of lumber will pass over the top surface of the rollers of the disk skids and clear the same as shown in Fig. 4. With the block of lumber properly positioned with relation to the disk skids the handle 61 of the disk skids is rotated to elevate the upper member of the disk skids and pick up the block of lumber and raise it out of contact with the rollers 25 of the roll cases. With the block of lumber thus free of the roll case rollers it may now be rolled laterally of the block along the disk skid rollers to a position adjacent the rear end thereof.

When reaching a desired location near the rear end of the disk skids the handle 61 is rotated to lower the block of lumber to rest upon the upper surface of the horizontal leg of the flipper, and at the same time apply two of the yoke members 101 to the block. The block of lumber is then flipped by turning the flipper through 90° as described above, thus turning the planks in the block of lumber from flatwise to edgewise position. The bottom edges of the plank then resting on the upper surface of the other leg members of the flipper. The handle 61 is again rotated to elevate the block of lumber free of the flipper bottom legs, and the flipper handle and flipper legs removed from underneath the block of lumber as described earlier herein.

The handle 61 is then rotated to lower the edgewise positioned block of lumber upon the upper surface of the two spacer bars. The yoke members 101 are then removed from the block of lumber and the respective planks, now standing edgewise, are moved manually or otherwise as desired along the spacer bars to position them successively in the notches in the upper surface of the spacer bars. When the planks of this block of lumber have been so turned from flatwise to edgewise position and placed in sequence in the notches beginning at the back end of the spacer bars, a new block of lumber is brought in, in the same manner as described above, turned to edgewise position, and spaced successively in the notches in the spacer bar, this being continued until all of the notches in the spacer bar are filled with edgewise positioned planks.

When the spacer bar notches are filled with edgewise positioned planks, one of the standards is inserted at each end of the two spacer bars as described above and rotated to fasten the same thereto. The spacer top is then lowered and the tubular members at each corner thereof telescoped over the tops of the standards and pinned thereto, and the screw handles 115 rotated to lower the floating bars 120, with their felt strips 122 contacting the upper edges of the planks, which thus securely holds the edgewise positioned planks against tilting. The hoist is then lowered and the hook 129 hooked into the ring 128 of the spacer top and the group of lumber thus held is transported to the stack foundation to form the first course of the stack. Two or more hanger bars are then quickly positioned over the top of this first course as stated above, and the two spacer bars removed through the slots 135 and 136 in the walkway, it being understood that before the spacer bars are removed from these slots, and before the hanger bars were positioned on the course, that the spacer top had been removed from the standards and the standards removed from the spacer bars.

The spacer bars are then returned to the chassis table tops, and the process repeated until the spacer bar notches are again filled with edgewise positioned planks which, in the manner described above, are locked in position in the spacer top and transported to the stack for the second course, the second course resting upon the upper surfaces of the hanger bars on the top of the first course. This is repeated until the stack has reached the desired height, it being kept in mind that the plank in each vertical tier will be in vertical alinement with each other, and spaced apart from the next adjacent plank to form the vertical passageways down which the outside air passes during the seasoning period. In order to facilitate travel of the sap from the inside cells to the exterior faces of the plank, each face of each plank is planed off a slight amount prior to being stacked, so as to present fresh cells to the outside to speed the seasoning process.

After the lumber has been seasoned, by the passage of outside air thereover for the desired length of time, the lumber may be unstacked by following the reverse steps. In other words, the steps followed in unstacking the lumber is reversed to that described above for stacking the same. During the unstacking process the flipper will receive the lumber in edgewise position and flop it through 90° from edgewise to flatwise position, with any desired number of planks in each block during the flopping operation.

As used in the above description, the term "block" refers to any desired number (five being shown in the drawings for illustrative purposes only) of planks, which are moved in longitudinally along the roll cases and subsequently flipped to edgewise position; the term "roll case" refers to the longitudinally positioned series of units having the spaced apart rollers 25 for bringing the flatwise group of lumber into the seasoning house, and moving it longitudinally therein; the term "disk skids" refers to the members extending at right angles to the roll cases for lifting the block of lumber off of the roll cases and moving it laterally with respect thereto for flipping and spacing the lumber; the term "flipper" refers to the device for turning the block of lumber from flatwise to edgewise position for stacking; and the term "flopper" is used to denote the flipper when used for turning the lumber from edgewise to flatwise position when unstacking.

I claim:

1. Transfer apparatus for handling lumber, comprising, a disk skid having a bottom stationary member, a top longitudinally movable member, and a plurality of links each pivoted at its lower end to said stationary bottom member and pivoted at its upper end to said movable top member, a screw threadably mounted in the stationary bottom member for longitudinal movement therein and having a block adjacent one end for longitudinal movement with the screw, and spaced cross members fixed in the movable top member between which said block is mounted, whereby when said screw is rotated in one direction the top member will move longitudinally in one direction and simultaneously downwardly due to the swinging of said links, and when said screw is rotated in the opposite direction said top member will move longitudinally in the opposite direction and simultaneously upwardly.

2. Apparatus as claimed in claim 1, in which said block is provided on its upper side with a roller positioned between said spaced cross members which latter move upwardly and downwardly over the roller as the screw is rotated in one direction or the other.

3. Transfer apparatus for handling lumber, comprising, a chassis having a pair of laterally spaced tables rigidly secured together, a roll case, a pair of parallel disk skids arranged one on each table, each of said disk skids having a stationary bottom member and a longitudinally movable top member, a plurality of links each pivotally connected adjacent its lower end to said bottom member and adjacent its upper end to said top member, and means for moving the top member longitudinally with relation to the bottom member and simultaneously upwardly and downwardly for raising and lowering lumber while arranging it for further disposition, and guide means on the roll case for guiding the chassis and disk skids as a unit into any predetermined one of a plurality of positions along the roll case when lowered thereonto.

4. Transfer apparatus as claimed in claim 3, in which said means includes the bottom member having fixed in one end a longitudinally apertured threaded nut, a threaded screw member threadably rotatable in said nut for longitudinal movement during rotations therein, a handle on said screw member, and articulating means on the inner end portion of the screw member and in the top member for moving the top member longitudinally upon rotation of the screw member and accommodating the upward and downward movement of the top member during the swinging of said links.

5. Transfer apparatus as claimed in claim 4, in which said stationary bottom member comprises an I-beam, and the movable top member comprises a channel member movably mounted in the channel on one side of the I-beam and adapted to be seated on the web thereof when the top member is down to its greatest extent, there being rollers rotatably mounted in the channel of the channel member upon which rollers the lumber selectively rests and moves when the top member is up.

6. In combination in apparatus for handling lumber, an elongated roll case having rollers for transporting endwise a group of heavy flatwise pieces of lumber, said roll case having longitudinally extending inner and outer side members, a chassis comprising a pair of laterally spaced apart tables rigidly secured together, a pair of disk skids mounted one on each of said tables to extend at right angles to the roll case, each of said disk skids at the roll case and extending beyond its table and across the roll case and being movable vertically downwardly to rest on said outer and inner side members of the roll case, downwardly and inwardly inclined positioning members fixed to that face of the inner side member nearest to said tables and spaced longitudinally therealong in pairs to be opposite said tables when in operation, the adjacent ends of the tables sliding downwardly along the inclined positioning members to properly position the disk skids on the side members of the roll case when lowered thereonto, said chassis being movable to different positions along the roll case by being picked up by a crane, moved horizontally and then lowered, and each of said disk skids having a stationary bottom member, a movable top member, a plurality of links pivotally connected to said bottom and top members, and means for moving the top member longitudinally of the bottom member to selectively move the top member up and down by swinging the links, whereby heavy groups of flatwise pieces of lumber may be moved endwise along the roll case, then picked up by the disk skids and rolled laterally therealong and lowered for having the individual pieces of lumber positioned edgewise in spaced relation prior to stacking.

7. In combination in apparatus for handling lumber, an elongated roll case having rollers for transporting endwise a group of heavy flatwise pieces of lumber, a chassis comprising a pair of laterally spaced apart tables rigidly secured together, a pair of disk skids mounted one on each of said tables to extend at right angles to the roll case, each of said disk skids comprising an elongated stationary bottom member, links pivotally connected at one end to said bottom member, an elongated longitudinally movable top member to which the other ends of the links are pivotally connected, power means for moving the top member longitudinally to selectively move the top member up and down through swinging of the links, a series of rollers in said top member, each of said disk skids projecting at one end beyond its table and across the roll case to rest on the top edges of the roll case sides, said chassis and the disk skids thereon being movable upwardly as a unit to lift the projecting ends of the disk skids upwardly away from the roll case, and be movable longitudinally of the roll case and be set down on the roll case in a new position.

8. In apparatus for handling lumber, a longitudinal series of roll cases adapted for moving a group of flatwise stacked pieces of lumber longitudinally, a chassis having a pair of laterally spaced tables secured together as a unit and having one end adjacent said roll cases, a disk skid on each of said tables and extending at right angles to said roll cases, each of said roll cases having at each side a vertically extending side wall member, each of said disk skids extending beyond the end of its table adjacent the roll cases and over both of said roll case side wall members, each of said disk skids having on the bottom face of its extending end a pair of notches seatable over the top edges of said side wall members, whereby said chassis may be lifted and changed to selected positions with relation to the roll cases with said notches fitting over the top edges of said side wall members to properly position the disk skids with relation to the roll cases, the inner side wall member having longitudinally spaced inclined guide members fixed to its side face adjacent the table ends, whereby when the chassis is lowered into position said adjacent table ends will slide downwardly over the faces of said inclined guide members and guide said notches into registry with the top edges of said roll case side members to receive the same.

ROBERT Z. DRAKE.

References Cited in the file of this patent

UNITED STATES PATENTS

| Number | Name | Date |
|---|---|---|
| 987,185 | Steedman | Mar. 21, 1911 |
| 1,455,273 | Sheen | May 15, 1923 |
| 1,588,949 | Drake | June 15, 1926 |
| 1,776,201 | St. Clair et al. | Sept. 16, 1930 |
| 1,836,690 | Talbot | Dec. 15, 1931 |
| 1,840,972 | Raymond | Jan. 12, 1932 |
| 1,998,968 | Rosin | Apr. 23, 1935 |
| 2,012,219 | Chambers | Aug. 20, 1935 |
| 2,012,220 | Chambers | Aug. 20, 1935 |
| 2,156,248 | Wegner | Apr. 25, 1939 |
| 2,156,876 | Scull | May 2, 1939 |
| 2,168,205 | Harten et al. | Aug. 1, 1939 |
| 2,181,357 | Chipman | Nov. 28, 1939 |
| 2,206,766 | Cushnie | July 2, 1940 |
| 2,278,102 | Davis | Mar. 31, 1942 |
| 2,360,661 | Eddy et al. | Oct. 17, 1944 |

FOREIGN PATENTS

| Number | Country | Date |
|---|---|---|
| 417,300 | Germany | Aug. 20, 1925 |